March 16, 1965 R. N. LEVINN 3,174,017

ADJUSTABLE THERMOSTAT WITH OVERRIDING CONTROL

Filed Aug. 2, 1961

INVENTOR.
ROBERT N. LEVINN
BY
*James and Franklin*
ATTORNEYS

United States Patent Office 3,174,017
Patented Mar. 16, 1965

3,174,017
ADJUSTABLE THERMOSTAT WITH OVERRIDING CONTROL
Robert N. Levinn, Catskill, N.Y., assignor to American Thermostat Corporation, South Cairo, N.Y., a corporation of New York
Filed Aug. 2, 1961, Ser. No. 128,828
4 Claims. (Cl. 200—139)

The present invention relates to an adjustable thermostat adapted to control an electric circuit in accordance with the temperature sensed thereby, and in particular to one in which the temperature range over which the thermostat may be adjusted can itself be varied by means of an overriding control.

Thermostatic control of electrical circuits is very common, and is an essential feature of many different types of electrical appliances, such as irons, fry pans, skillets, pots, to mention just a few. These appliances are generally provided with an electrically energized heating element in series with a thermostatically controlled switch, the thermostat being sensitive to temperature and causing energization of the heating element until that temperature has been attained, thereafter intermittently energizing the heating element in order to cause that temperature to be maintained. In many applicances the particular temperature to be attained and maintained is not always the same, and must be selected by the user of the appliance. Thus, in the case of a cooking appliance such as a fry pan different temperatures are desired for different cooking operations, such as cooking scrambled eggs or making french fried potatoes. Some means for manually adjusting the temperature at which the thermostat is to function is required.

Since each of a number of different types of appliances is designed for its own particular use, the range of temperatures over which one appliance is to be useable may differ from the range of temperatures applicable to another appliance. In some instances this is a matter of inherent operation, and in other instances it is a matter of choice on the part of the appliance manufacturer. For example, one manufacturer might wish the range of temperature adjustment possible to have a lower limit of 130°F., another manufacturer might wish a lower limit of 160°F., and the third manufacturer might wish a lower limit of 180° F. Ordinarily this would require the use of individually designed thermostat controls for each of those specifications. Where, as is often the case, a number of different appliance manufacturers purchase their thermostatic controls from a single source, that source has had to separately design and manufacture individual thermostats for each of the appliance manufacturers in question.

Obviously, this a source of considerable trouble and expense to the thermostat manufacturer. It would be most advantageous if that manufacturer could produce one standard unit for all of the appliance manufacturers in question, which standard unit could readily be adjusted to correspond to the individual specifications set by each of those appliance manufacturers. It is to the accomplishment of this result that the present invention is primarily directed.

There is a secondary factor involved in thermostat design which is also of significance. The switch controlled by the thermostat must be settable to an "off" condition. This usually involves mechanically separating the contacts of the switch so that, at normal room temperature, they will not engage one another. If the appliance should be plugged into a source of electrical power and if the temperature of the room should fall abnormally to a degree sufficient to actuate the thermostat which controls the switch even though that thermostat is set to "off," as may often occur, the switch may nevertheless be turned on by the thermostat—the fall in temperature is sufficient to cause the movable contact to move into engagement with the normally fixed contact. This results in an unwanted use of electricity and also represents a source of potential danger, since a person may suffer a rather severe burn if he should grasp a utensil which he thought was unheated but which instead was heated. It is a secondary object of the present invention to prevent this type of unwanted energization of a utensil connected to a source of electricity.

In accordance with the present invention a standard thermostat-switch unit is designed which comprises first and second contacts movable into engagement with one another to close the circuit and separable from one another to open the circuit. First manually adjustable means, such as a conventional knob, is operatively connected to the first of these contacts so as to locate it in a desired position relative to the second contact, that position corresponding to the desired temperature of operation of the associated appliance. The second contact is operatively connected to a temperature-sensitive means and is adapted to be moved toward and away from the first contact in accordance with the temperature sensed by that means. The particular location of the first contact, as determined by the setting of the first adjustable means, will determine the temperature at which the contacts will separate or engage, as the case may be, that representing the desired operating temperature of the associated appliance. As thus far described the device is essentially conventional. In order to provide a relatively positive but adjustable determination of one limit of the range of temperatures over which the thermostat may be adjusted, a second adjusting means is provided which is active upon the second, or thermostat-controlled, contact and is effective to positively limit the degree to which that contact can move in one direction relative to the first contact. This second adjusting means is of a type which can be pre-set at the factory but which is preferably not normally accessible to the user of the device. Thus the manufacturer can produce a standard unit operative over temperatures from room temperature to a predetermined maximum, which standard device can be adapted to the individual specification, by a particular appliance manufacturer, of the limit (usually the lower limit) of the range of temperatures over which the thermostat should be manually adjustable by the user of the appliance by setting the second manual adjusting means at the factory. This provides a "positive-off" control at a predetermined point irrespective of the setting of the first adjusting means accessible to the user of the appliance, which "positive-off" control overrides the adjustable control which the user of the appliance manipulates. If, as is usually the case, this "positive-off" control is set to a temperature well above any foreseeable room temperature, e.g. 130°F., the appliance cannot become energized accidentially when the first manual control accessible to the user is set in "off" position.

To the accomplishment of the above, and to such other objects as may hereinafter appear, the present invention relates to a thermostat-switch control as defined in the appended claims and as described in this specification, taken together with the accompanying drawings, in which:

Figure 1:
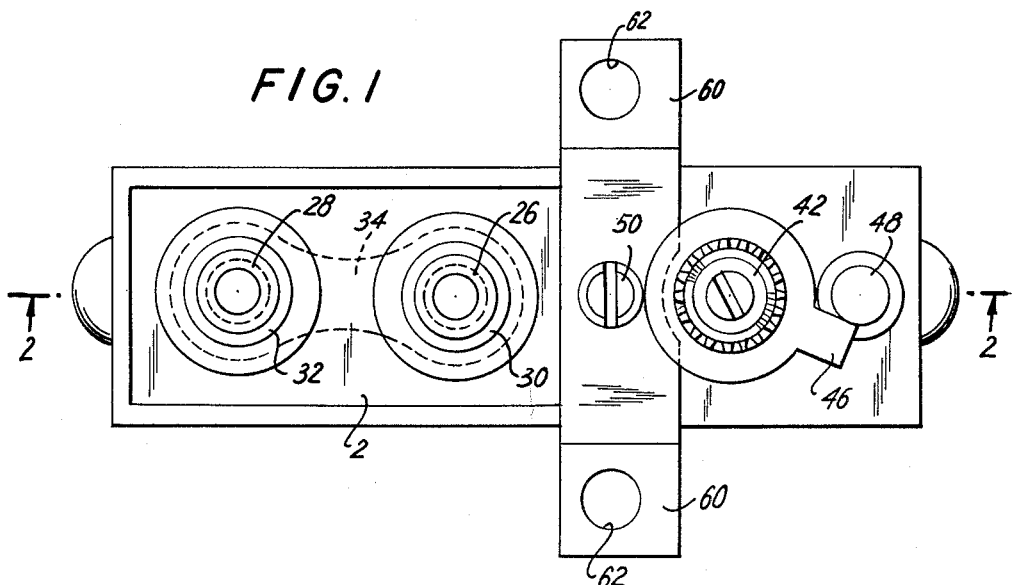
FIG. 1 is a top plan view of one embodiment of the present invention.

The thermostat-switch assembly may comprise a top wall 2 having depending side walls 4, to which an expansible bottom member generally designated 6 is connected, that member comprising a bottom wall 8 and upstanding side walls 10 connected to the side walls 4 by means of screws 12. Extending across the upper surface of the bottom wall 8 is a spring leaf 14 the spaced ends 16 of which are secured to the bottom wall 8 in any appropriate manner, as by being welded thereto, the body of the spring leaf 14 being spaced above the bottom wall 8 and carrying an adjustably positionable screw 18 having an insulated end piece 20.

Mounted on the underside of the top wall 2 are a pair of conductive spring arms 22 and 24, the ends 22a and 24a respectively of which are secured to the top wall 2 by conductive rivets 26 and 28 respectively, those rivets passing through insulating bushings 30 and 32 respectively, and insulating sheet 34 being interposed between the bottom wall 2 and the conductive spring ends 22a and 24a. Individual electrical connection to each of the conductive spring leaves 22 and 24 is made by means of the rivets 26 and 28 respectively. The spring leaf 20a is located above and overlying the spring leaf 24, the leaves 22 and 24 carrying at their free ends opposed conductive contact buttons 36 and 38 respectively.

The spring leaf 22 is biased upwardly, as by its inherent resiliency, into engagement with an insulating tip 40 at the lower end of a shaft 42 which passes through and threadedly engages a tapped aperture 44 formed in the top wall 2. Rotation of the shaft 42 causes it to move axially up and down as viewed in FIG. 2, thus moving the spring leaf 22 and its contact button 36 up and down correspondingly. A finger 46 is secured to and extends radially from the shaft 42 above the top wall 2 and is adapted to cooperate with a stud 48 which extends upwardly from the top wall 2, the stud 48 defining a positive stop for rotation of the shaft 42 in both directions, that shaft having an appreciable degree of permitted angular rotation, e.g. 310 degrees.

A second screw 50 is threadedly received in aperture 52 in the top wall 2, that aperture being located between the aperture 44 and the rivet 26, and that screw 50 carries at its lower end an insulating member 54 which passes through an aperture 56 in the spring leaf 22 and extends toward the spring leaf 24. The spring leaf 24 is spring biased downwardly, as by its own inherent resiliency, into engagement with the end piece 20 carried by the spring 14.

Figure 2:
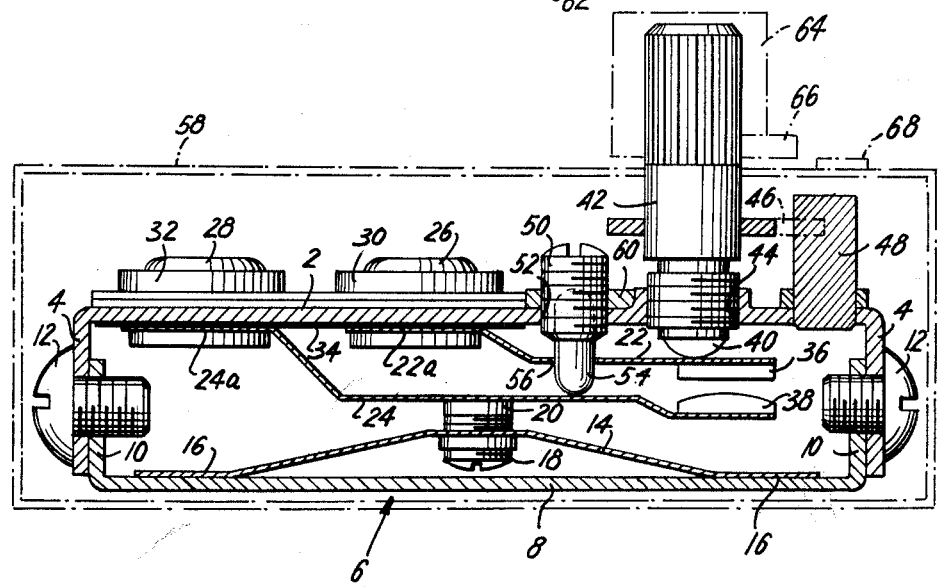
FIG. 2 is a cross sectional view thereof taken along the line 2—2 of FIG. 1, and with a housing therefor being shown in broken lines.

The entire assembly is adapted to be mounted within housing 58, being there secured by means of bracket 60 provided with screw holes 62 (see FIG. 1), the shaft 42 having a knurled portion extending up above the housing 58 and there adapted to be provided with a knob 64 having an indicator pointer 66 adapted to cooperate with appropriate indicia 68 formed on the top wall of the housing 58, those indicia being graduated in terms of temperature and having an "off" indication corresponding to the position of the indicator pointer 66 when the finger 46 is in its position shown in FIG. 1, at which time the shaft 42 will be in its axially raised position as shown in FIG. 2.

The temperature sensitive part of the assembly is constituted by the bottom wall 8 which, as its temperature rises, expands laterally as viewed in FIG. 2, thereby extending the spring 14 laterally and causing the screw 18 and end piece 20 carried thereby to move downwardly, the leaf spring 24 and the contact button 38 carried thereby moving downwardly therewith. Conversely, as the temperature of the bottom wall 8 decreases, its width decreases, the spring 14 is laterally comprised, and the screw 18, end piece 20, spring leaf 24 and contact button 38 are moved upwardly.

The degree to which the contact button 38 carried by the spring leaf 24 may move upwardly is, however, positively limited by the insulating member 54 carried by the screw 50, entirely independently of the action of the spring 14. Thus the adjustment of the screw 50 defines a positive limit to the upward movement of the contact button 38, and even if the bottom wall 8 should contract laterally sufficiently to tend to move the contact button 38 up beyond that limiting position, it will not thus move. Indeed, with the parts located as shown, the insulating member 54 carried by the screw 50 being interposed between the contact button 38 and the end piece 20, further lateral contraction of the bottom wall 8 beyond that shown in FIG. 2, such as would occur if the temperature to which that bottom wall 8 is subjected were to become lower, would cause the strip 24 to pivot about the insulated member 54 so as to move the contact button 38 away from the contact button 36.

Thus the thermostat assembly can be so designed as, in the absence of the screw 50 and the insulating member 54 carried thereby, to cause the contact button 36 to be just separated from the contact button 38 when the bottom wall 8 is at normal room temperature and the shaft 42 is rotated so as to assume its maximum upper position with the finger 46 engaged with the stud 48, this representing its "off" position. As the shaft 42 is rotated from that position it will move the contact button 36 downwardly into engagement with the contact button 38, thus closing the electrical circuit through the switch. That circuit will remain closed until the temperature to which the bottom wall 8 is subjected has risen to a value such that the lateral expansion of the bottom wall 8 permits the spring leaf 24 to stretch laterally sufficiently to cause the contact button 38 to separate from the contact button 36. This represents the conventional mode of operation of a device of this type. It will be appreciated that under these circumstances (and without the action of the screw 50 and insulating member 54 carried thereby) the low point of the temperature range over which the thermostat may be adjusted to cause the circuit through the switch to close will be close to room temperature and will be invariant for a given assembly design.

By setting the screw 50 to a desired position the highest position to which the contact button 38 can rise is positively determined, and thus the minimum temperature at which the contact buttons 36 and 38 can engage in order to close the electrical circuit is positively controlled entirely independently of the rotation of the shaft 42. If, then, a given appliance manufacturer does not wish the circuit to be closed until a temperature of 130° F. is attained, the screw 50 will be set to limit the upward movement of the contact button 38 to a degree such that it will engage with the contact button 36 only when the shaft 42 has been rotated to a degree corresponding to that temperature. If the particular specifications involved call for a minimum temperature of 160° F., the screw 50 will be further moved downwardly, thus preventing the contact buttons 36 and 38 from engaging until the shaft 42 has been rotated to a position corresponding to that temperature, moving the contact button 36 down correspondingly.

Whenever the screw 50 is operatively set, its action in preventing the contact button 38 from moving upwardly toward the contact button 36 will positively prevent the switch from closing even if the temperature sensed by the thermostat is abnormally low. Hence accidental and unwanted energization of the heating element of the controlled appliance is positively prevented.

Since adjustment of the screw 50 to provide the "positive-off" control for the lower range of temperatures over which the thermostat can be adjusted is a matter of initial design, and is not to be under the control of the user of the appliance, the screw 50 will normally be obstructed by the housing 58. The user of the appliance will, as is conventional, have only a single control—the knob 64—to manipulate to determine the particular temperature to be attained and maintained by the appliance under control.

By means of this construction the thermostat manufacturer can design and manufacture a single standard unit useable in many different applications, that standard unit being adaptable to meet individual specifications as to one limit of the temperature range over which the thermostat is to be adjusted by proper setting of the screw 50 which, when once set, remains in adjusted position. The savings in manufacturing cost will be apparent.

While but a single embodiment of the present invention has been here disclosed, it will be apparent that many variations may be made therein, all within the scope of the following claims.

I claim:

1. A thermostat comprising a support, first and second flexible strips mounted on said support at a given area and carrying opposed electrical contacts movable with their respective strips between positions engaging one another and separated from one another respectively, first adjusting means mounted on said support and operatively connected to said first strip for moving it to a desired position, temperature sensitive means operatively connected to said second strip for moving it toward and away from said first strip as the temperature sensed thereby varies, and second adjusting means mounted on said support between said first adjusting means and said given area and operatively connected to said second strip for positively limiting the degree to which said second strip can move with its contact toward said first strip, said second adjusting means being operatively connected to said second strip at a point between the contact carried by said second strip and the point where said temperature sensitive means is operatively connected to said second strip.

2. A thermostat comprising a support having walls, upper and lower flexible strips mounted on said support at a given area, overlying one another at least in part, and carrying opposed electrical contacts movable with their respective strips between positions engaging one another and separated from one another respectively, first adjusting means carried by said support and operatively connected to one of said strips for moving it to a desired position, one of the walls of said support being expansible with rise in temperature and being operatively connected to the other of said strips to move it toward and away from said one of said strips as the temperature sensed thereby varies, and second adjusting means mounted on said support between said first adjusting means and said given area and operatively connected to said other of said strips for positively limiting the degree to which said other strip can move with its contact toward said one strip, said second adjusting means being operatively connected to said other of said strips between the contact carried by said other of said strips and the point where said temperature sensitive means is operatively connected to said other of said strips.

3. A thermostat comprising a support having upper and lower walls, upper and lower flexible strips mounted on said upper wall of said support at a given area, overlying one another at least in part, and carrying opposed electrical contacts movable with their respective strips between positions engaging one another and separated from one another respectively, first adjusting means carried by said upper wall of said support and operatively connected to said upper strip for moving it to a desired position, said lower wall of said support being expansible with rise in temperature and being operatively connected to said lower strip to move it toward and away from said upper strip as the temperature sensed thereby varies, and second adjusting means mounted on said upper wall of said support between said first adjusting means and said given area and operatively connected to said lower strip for positively limiting the degree to which said lower strip can move with its contact toward said upper strip, said second adjusting means being operatively connected to said lower strip at a point between the contact carried by said lower strip and the point where said temperature sensitive means is operatively connected to said lower strip.

4. A thermostat comprising a support having upper and lower walls, upper and lower flexible strips mounted on said upper wall of said support at a given area, overlying one another at least in part, and carrying opposed electrical contacts movable with their respective strips between positions engaging one another and separated from one another respectively, first adjusting means carried by said upper wall of said support and operatively connected to said upper strip for moving it to a desired position, said lower wall of said support being expansible with rise in temperature and being operatively connected to said lower strip to move it toward and away from said upper strip as the temperature sensed thereby varies, and second adjusting means mounted on said upper wall of said support between said first adjusting means and said given area and operatively connected to said lower strip for positively limiting the degree to which said lower strip can move with its contact toward said upper strip, said upper strip having an aperture therein through which said second adjusting means extends between said upper support wall and said lower strip, said second adjusting means being operatively connected to said lower strip at a point between the contact carried by said lower strip and the point where said temperature sensitive means is operatively connected to said lower strip.

References Cited in the file of this patent

UNITED STATES PATENTS

| | | |
|---|---|---|
| 2,190,276 | Smith | Feb. 13, 1940 |
| 2,317,033 | Dafforn | Apr. 20, 1943 |
| 2,574,869 | Green | Nov. 13, 1951 |
| 2,640,130 | Reingruber et al. | May 26, 1953 |
| 2,703,832 | Reingruber et al. | Mar. 8, 1955 |
| 2,804,524 | Dahlen | Aug. 27, 1957 |
| 2,805,302 | Reis | Sept. 3, 1957 |
| 2,897,320 | Patti | July 28, 1959 |
| 2,988,621 | Cassidy | June 13, 1961 |
| 3,004,121 | Huffman | Oct. 10, 1961 |
| 3,051,808 | Reffel | Aug. 28, 1962 |